United States Patent
Miginnis et al.

(10) Patent No.: US 10,832,073 B2
(45) Date of Patent: Nov. 10, 2020

(54) TEXT RESOLUTION DETERMINATIONS VIA OPTICAL PERFORMANCE METRICS

(71) Applicant: HEWLETT-PACKARD DEVELOPMENT COMPANY, L.P., Houston, TX (US)

(72) Inventors: Emily Ann Miginnis, San Diego, CA (US); Yow Wei Cheng, Taipei (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/077,691

(22) PCT Filed: Jul. 10, 2017

(86) PCT No.: PCT/US2017/041425
§ 371 (c)(1),
(2) Date: Aug. 13, 2018

(87) PCT Pub. No.: WO2019/013757
PCT Pub. Date: Jan. 17, 2019

(65) Prior Publication Data
US 2020/0293808 A1   Sep. 17, 2020

(51) Int. Cl.
*G06K 9/32* (2006.01)
*G06K 9/62* (2006.01)

(52) U.S. Cl.
CPC ......... *G06K 9/3233* (2013.01); *G06K 9/3216* (2013.01); *G06K 9/3283* (2013.01); *G06K 9/6265* (2013.01); *G06K 2009/3225* (2013.01)

(58) Field of Classification Search
None
See application file for complete search history.

(56) References Cited

U.S. PATENT DOCUMENTS 4,586,817 A * 5/1986 Ehemann, Jr. ..... G01M 11/0292
356/124.5
5,153,418 A * 10/1992 Batterman ........... G06K 7/1093
235/456

(Continued)

FOREIGN PATENT DOCUMENTS

WO   2014003767 A1   1/2014
WO   2016018411 A1   2/2016

OTHER PUBLICATIONS

Franks, "Introducing the Justand V2", Retrieved from the internet—https://procomputingproducts.co.uk/blogs/news/14193187-introducing-the-justand-v2, May 23, 2014, 2 Pages.

(Continued)

*Primary Examiner* — Anand P Bhatnagar
(74) *Attorney, Agent, or Firm* — Mannava & Kang

(57) ABSTRACT

An example non-transitory machine-readable storage medium encoded with instructions executable by a processor is provided. The machine-readable storage medium includes instructions to identify fiducials on a target comprising multiple sample areas, instructions to determine positions of the fiducials in relation to the multiple sample areas, and instructions to detect a different region of interest (ROI) associated with each of the multiple sample areas based upon the positions. The machine-readable storage medium further includes instructions to calculate an optical performance metric based upon the ROI associated with each sample area, and instructions to determine a text resolution based upon the optical performance metric.

15 Claims, 7 Drawing Sheets

(56) References Cited

U.S. PATENT DOCUMENTS

| | | | | |
|---|---|---|---|---|
| 5,189,292 A | * | 2/1993 | Batterman | G06K 7/1093 |
| | | | | 235/456 |
| 5,223,701 A | * | 6/1993 | Batterman | G06K 7/1093 |
| | | | | 235/456 |
| 5,774,236 A | * | 6/1998 | Blazey | H04N 1/4055 |
| | | | | 358/3.14 |
| 6,765,617 B1 | * | 7/2004 | Tangen | H04N 9/045 |
| | | | | 348/340 |
| 7,322,700 B2 | * | 1/2008 | Miyagaki | H04N 5/7416 |
| | | | | 348/771 |
| 7,815,118 B2 | * | 10/2010 | Barsotti | G06K 7/10712 |
| | | | | 235/462.35 |
| 8,711,275 B2 | | 4/2014 | Rukes | |
| 9,338,447 B1 | * | 5/2016 | Crump | H04N 17/02 |
| 9,600,702 B2 | | 3/2017 | Isozumi et al. | |
| 2005/0276513 A1 | | 12/2005 | Ojanen et al. | |
| 2007/0119942 A1 | * | 5/2007 | Barsotti | G06K 7/10801 |
| | | | | 235/462.24 |
| 2012/0013760 A1 | * | 1/2012 | Parodi-Keravec | |
| | | | | G01M 11/0264 |
| | | | | 348/222.1 |
| 2012/0293666 A1 | | 11/2012 | Wong et al. | |
| 2020/0059641 A1 | * | 2/2020 | Pirinen | G01J 3/501 |

OTHER PUBLICATIONS

"Belkins—Tablet Stage", Retrieved from internet—http://belkinbusiness.com/products/b2b054-tablet-stage, May 23, 2017, 2 Pages.

* cited by examiner

TEXT RESOLUTION DETERMINATIONS VIA OPTICAL PERFORMANCE METRICS

BACKGROUND

Image-capturing devices such as cameras are commonly employed in portable electronic devices such as multimedia players, smart phones, and tablets. During the manufacture of image-capturing devices, a calibration process may be conducted to evaluate optical performance.

BRIEF DESCRIPTION OF THE DRAWINGS

Various examples are described below referring to the following figures.

DETAILED DESCRIPTION

Figure 1:
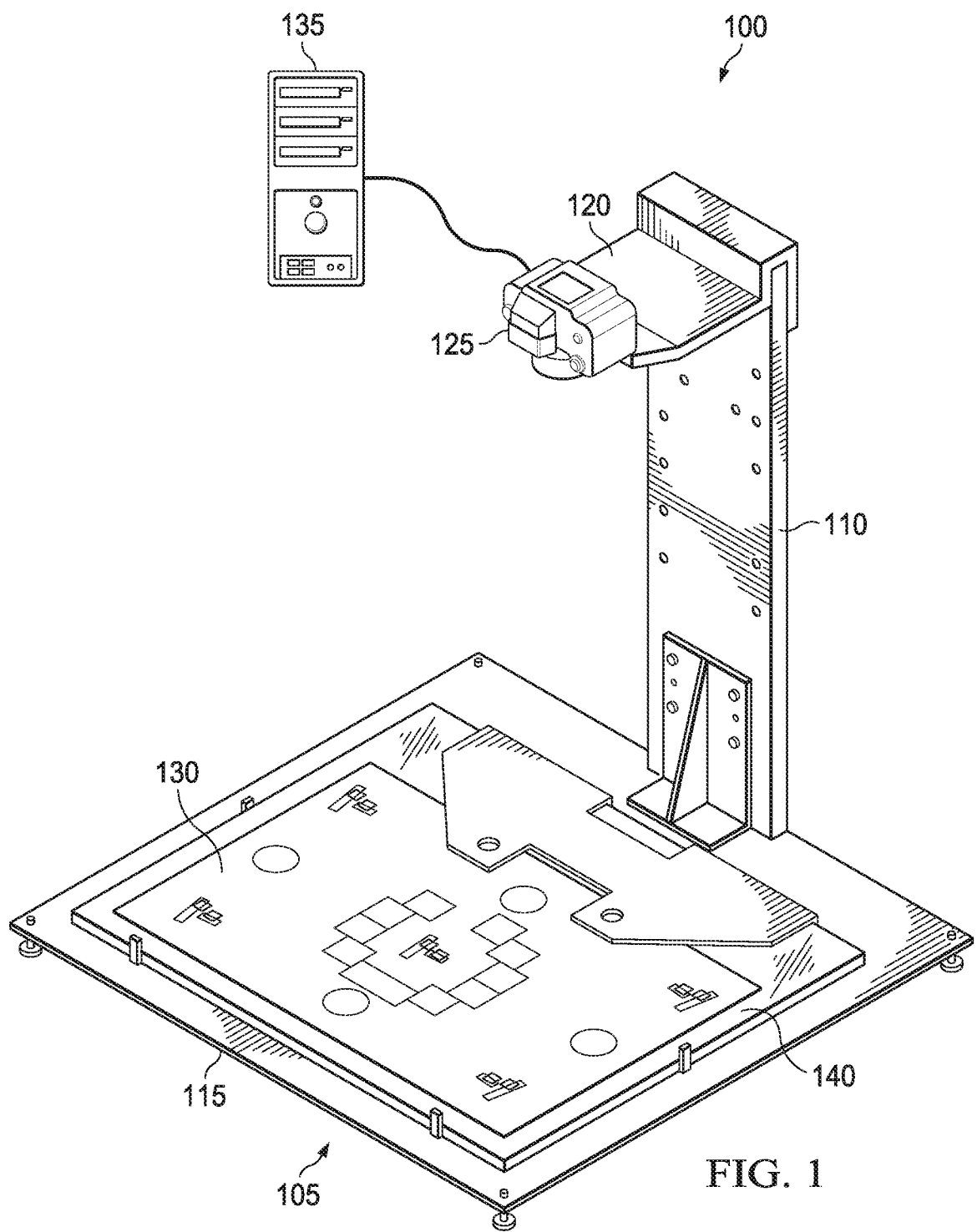
FIG. 1 shows a test system for evaluating optical performance of an image-capturing device in accordance with various examples.

Image-capturing devices may undergo a series of tests to quantify various optical metrics such as resolution and depth of field (DOF). Resolution generally refers to the ability of a camera lens to resolve varying levels of detail, while DOF generally refers to the ability of a camera lens to maintain a desired degree of image quality (i.e., a spatial frequency at a specified contrast) as an object is positioned closer to and farther away from the camera lens. A number of test targets may be employed to measure resolution and DOF. As to the former, a test target including a pattern may be used to measure resolving power, limiting resolution, and spatial frequency response (SFR) of an image-capturing device. During image capture, the test target may be oriented in an object plane that can be parallel to an imaging plane of the image-capturing device, so as to reduce or prevent perspective distortion when an image of the test target is captured by the image-capturing device. However, the test target may also be oriented in an object plane that is not parallel to the imaging plane of the image-capturing device.

As described in greater detail below, the pattern of the test target may include features such as vertical and horizontal squares or rectangles that are slightly rotated such that the sides of the squares or rectangles define slanted edge targets, which may be used to measure the gradient of each edge at multiple phases relative to imaging sensing components of the image-capturing device (e.g., a pixel array). Other shapes, such as circles or triangles, are used in some examples. Regions of interest (ROI) near the vertical and horizontal edges define sampling areas from which data may be sampled and used to compute modulation transfer function (MTF) values. MTF values generally provide an indication regarding the ability of the image-capturing device to resolve fine detail in a target of a captured image. The amount of detail in a captured image may be specified as spatial frequency in line pairs per millimeter (lp/mm), where a line pair is one cycle of a light bar and dark bar of equal width and has a contrast of unity.

Stated differently, spatial frequency refers to the number of cycles of alternating dark and light bars. For example, a line pair containing one dark bar and one light bar would correspond to a spatial frequency of one cycle. As another example, a continuous series of black and white line pairs with a spatial period measuring 1 micrometer per pair would repeat 1000 times every millimeter, and therefore have a corresponding spatial frequency of 1000 lines per millimeter.

Slanted edge targets may be used to compute MTF values by acquiring an edge profile from a captured image, computing the derivative in the direction of the edge, and computing the discrete Fourier transform of the computed derivative. The edge profile refers to an edge spread function (ESF), which is the intensity across an imaged slanted edge target as a function of spatial position. Taking the derivative of the ESF produces a line spread function (LSF), and taking the Fourier transform of the LSF produces the MTF, which is analogous to SFR. While slanted edge targets may provide a simple tool to measure MTF in terms of lp/mm, the ability to resolve line pairs comprising alternative black and white lines may not be of particular interest to users of image-capturing devices. Moreover, a separate test target such as a wedge may be needed to measure DOF. For instance, the wedge may include an inclined plane surface having line pairs such as horizontal and vertical lines of different densities. However, the wedge may be too small and may not cover an entire field of view (FOV) of an image-capturing device. Therefore, the wedge may need to be repositioned to evaluate the DOF of the image-capturing device over a desired range of depth, where repeatability of wedge location can pose an issue.

Disclosed herein are examples of techniques for evaluating the optical performance of an image-capturing device. The image-capturing device may be mounted at an angle with respect to a target such that the DOF across an entire FOV of the image-capturing device may be computed using a single image of the target. The disclosed techniques include correlating the optical performance with text resolution, meaning that the ability of the image capturing device to capture and resolve text of different font styles/points may be understood according to the correlation. For example, the correlation may indicate whether text (e.g., a string of letters, numbers, symbols, and/or punctuation) would be legible when the image-capturing device captures an image of the text under substantially the same conditions as when the image-capturing device captures the single image of the target.

In one example according to the present disclosure, a non-transitory machine-readable storage medium encoded with instructions executable by a processor is provided. The machine-readable storage medium comprises instructions to identify fiducials on a target comprising multiple sample areas, instructions to determine positions of the fiducials in relation to the multiple sample areas, and instructions to detect a different region of interest (ROI) associated with each of the multiple sample areas based upon the positions. The machine-readable storage medium further comprises instructions to calculate an optical performance metric based upon the ROI associated with each sample area, and instructions to determine a text resolution based upon the optical performance metric.

In some examples, each of the multiple sample areas comprises a distinct pair of alternating black and white lines having equal densities as one another, a slanted edge target, or both. In some examples, the non-transitory machine-readable storage medium includes instructions to receive a single image of the target, and instructions to compute a depth of field (DOF) across an entire field of view (FOV) of an image-capturing device using the single image. In some examples, the multiple sample areas comprise one sample area disposed at a center of the target and other sample areas disposed within a predetermined distance of corners of the target. In some examples, each of the multiple sample areas includes a horizontal rectangle and a vertical rectangle, the horizontal and vertical rectangles displaced from one another, and wherein each of the ROIs partially overlaps a different one of the horizontal and vertical rectangles.

In another example according to the present disclosure, a testing system is provided. The testing system includes a processor and a storage encoded with instructions. The instructions are executable by the processor to identify fiducials on a target comprising multiple sample areas including a first sample area and a second sample area, employ a computer vision technique to determine positions of each of the fiducials in relation to the first and second sample areas, detect a first region of interest (ROI) and a second ROI associated with the first and the second sample areas based upon the positions, calculate an optical performance metric based upon the first and second ROIs associated with the first and second sample areas, where the optical performance metric is calculated using a single image of the target, and determine a text resolution based upon the optical performance metric.

In some examples, the testing system includes an image-capturing device, coupled to the processor, to capture the single image, and the instructions are executable by the processor to compute a depth of field (DOF) using the single image. In some examples, the instructions are executable by the processor to compute the DOF across an entire field of view (FOV) of the image-capturing device, and to evaluate an ability of the image-capturing device to resolve text based on a correlation between the text resolution and the DOF across the entire FOV. In some examples, the instructions are executable by the processor to evaluate a raw optical quality of an image-capturing device based upon the optical performance metric, where the optical performance metric is a modulation transfer function (MTF), a contrast transfer function (CTF), or a spatial frequency response (SFR). In some examples, the target comprises a transmissive test chart disposed atop a light panel to provide uniform lighting through the transmissive test chart.

In yet another example according to the present disclosure, a test system is provided. The test system includes a test fixture to secure a target, and a storage encoded with instructions. The instructions are executable by a processor to identify a first marker and a second marker on the target, the target comprising a first slanted edge target and a second slanted edge target. The instructions are further executable by the processor to determine positions of the first and second markers in relation to the first and second slanted edge targets, detect a first region of interest (ROI) and a second ROI associated with the first and the second slanted edge targets based upon the positions, calculate an optical performance metric based upon the first and second ROIs associated with first and second slanted edge targets, and determine a text resolution based upon the optical performance metric.

In some examples, the instructions are executable by the processor to employ a computer vision technique to determine the positions of the first and second markers, the first and second markers comprising a first registration mark and a second registration mark, respectively. In some examples, the instructions are executable by the processor to refine a sharpness technique based upon the optical performance metric, where the optical performance metric is a modulation transfer function (MTF), a contrast transfer function (CTF), or a spatial frequency response (SFR). In some examples, the test fixture includes a rotatable mounting portion to secure an image-capturing device at a desired angle with respect to the target such that the first and second slanted edge targets are captured at different depths when the image-capturing device captures a single image of the target. In some examples, the instructions are executable to compute a depth of field (DOF) across an entire field of view (FOV) of the image-capturing device using the single image.

FIG. 1 shows a test system 100 in accordance with examples of the present disclosure. The test system 100 includes a test fixture 105, an image-capturing device 125, and a computing device 135. The test fixture 105 includes a stand 110 extending from a base portion 115 to a mount portion 120. The mount portion 120 may secure the image-capturing device 125, which may comprise any suitable device to capture images of a target object 130 placed on the base portion 115. For example, the image-capturing device 125 may comprise a digital camera, a video camera, video recorder, a still image capture device, a scanning device, a printing device, a smartphone, a tablet, or the like.

The image-capturing device 125 is communicatively coupled to the computing device 135, which may include any suitable device for performing the operations described herein for evaluating the optical performance of the image-capturing device 125. FIG. 1 includes a conceptual depiction of the computing device 135; a more detailed depiction will be described further below with respect to FIG. 3.

While the computing device 135 in the example of the test system 100 is shown in FIG. 1 as being separate from the image-capturing device 125, in other examples of the test system 100 the computing device 135 is a component of or integrated with the image-capturing device 125. The computing device 135 may be communicatively coupled to the image-capturing device 125 via a wired or wireless communication link, such as an IEEE 802.11 wireless network, an IEEE 802.3 wired network, or any other wired or wireless communication technology that allows images captured by the image-capturing device 125 to be transferred to the computing device 135.

The base portion 115 of the test fixture 105 comprises a light source 140, which may include any suitable device or devices capable of providing sufficient illumination. For example, the light source 140 may include a light emitting diode (LED), lasers, precision incandescent lights, shuttered light sources, or the like. In some examples, the computing device 135 may evaluate optical performance of the image-capturing device 125 based upon an image of a transmissive target object 130 captured by the image-capturing device 125. In such examples, the light source 140 may serve as a backlight to provide uniform illumination through the transmissive object 130.

In other examples, the computing device 135 may evaluate the optical performance of the image-capturing device 125 based upon an image of a reflective target object 130 captured by the image-capturing device 125. In such examples, the test system 100 may include additional or alternative light sources (not shown) surrounding the reflective target object 130 to provide uniform illumination onto the reflective target object 130.

The test fixture 105 may include any suitable mechanism to secure a target object 130 to the base portion 115, such as pins, screws, or the like. In some examples, base portion 115 may comprise a rotatable plate so that the target object 130 may be secured according to any desired orientation. Similarly, the mount portion 120 may be rotatable so that the image-capturing device 125 may be oriented at any desired angle with respect to the target object 130. As discussed further below, the angle may be selected to allow the computing device 135 to compute a DOF across the entire FOV of the image-capturing device 125 using a single image of the target object 130.

In some examples, the test system 100 includes various components and systems that have been omitted from FIG. 1 in the interest of clarity. Briefly, for example, the test system 100 may include display systems, user interfaces, printers, etc. The operation of the test system 100 is described in greater detail below with respect to FIGS. 2-6.

Figure 2:
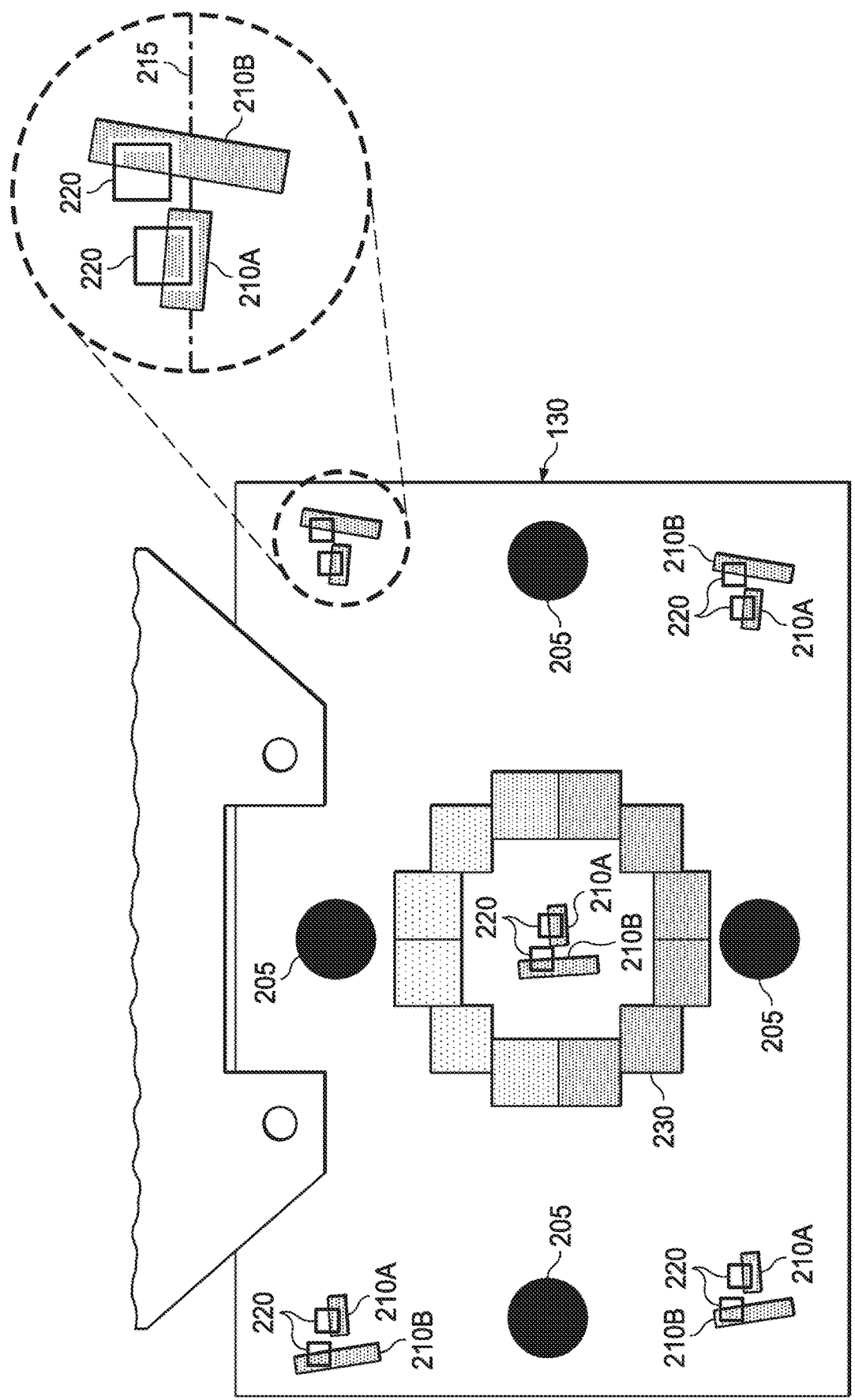
FIG. 2 shows a target object shown in the test system of FIG. 1 in accordance with various examples.

FIG. 2 shows an example of the target object 130 in accordance with the present disclosure. The target object 130 comprises a plurality of markers 205, such as registration marks that act as reference points to facilitate detection of features within the target object 130. For instance, in the depicted example the markers 205 are four circular fiducials 205 positioned at known locations such that the markers may act as locators. In other examples, the markers 205 may include more or fewer fiducials, which may comprise similar or different shapes.

The example target object 130 further includes sampling areas defined by five horizontal rectangles 210A and five vertical rectangles 210B, which may be positioned at known locations relative to the circular fiducials 205. In other examples, the sampling areas may be defined by additional and/or other shapes. For example, sampling areas may be defined by a pair or multiple pairs of alternating black and white lines. In such examples, the pair or pairs of alternating black and white lines may be the same as one another or distinct from one another (i.e., the sampling areas may be defined by the same or different alternating black and white lines). Similarly, the alternating black and white lines in each pair may have equal densities as one another or distinct densities than one another.

As shown in FIG. 2, one horizontal rectangle 210A and one vertical rectangle 210B may be disposed in a central location of the target object 130 to evaluate two respective ROIs 220 within that central location. However, resolution of the image-capturing device 125 may vary when analyzing features within the target object 130 away from the central location. Therefore, the remaining four horizontal and vertical rectangles 210A, 210B may be disposed about a periphery of the target object 130. For example, these remaining horizontal and vertical rectangles 210A, 210B may be arranged proximate to each of the four corners (e.g., a predetermined distance away from the central location or corner) in the target object 130 so that two respective ROIs 220 within each corner may be evaluated.

In addition, the horizontal and vertical rectangles 210A, 210B may be slightly rotated with respect to either the horizontal rows in an array of imaging elements (not shown) belonging to the image-capturing device 125, or with respect to the vertical columns in the array of imaging elements. Due to the rotation, an edge gradient (i.e., the transition from black-to-white or white-to-black) can be measured at multiple phases (or field angles) relative to the imaging components (e.g., pixels) of the image-capturing device 125. That is, the slanted edge targets defined by the sides of the rotated horizontal and vertical rectangles 210A, 210B are positioned at different locations within the FOV of the image-capturing device 125 such that MTF values may be computed in horizontal and vertical directions. For example, to compute MTF values in the horizontal direction, the horizontal rectangles 210A may be rotated at an angle such that each horizontal rectangle 210A is non-parallel to a central axis 215, as shown on the right-hand side of FIG. 2. Similarly, to compute MTF values in the vertical direction, the vertical rectangles 210B may be rotated at an angle such that each vertical rectangle 210B is non-orthogonal to the central axis 215.

Each ROI 220 surrounds an edge of a particular horizontal or vertical rectangle 210A, 210B such that the edge defines a boundary between two regions. For example, as shown on the right of FIG. 2, the ROI 220 surrounds the upper edge of the horizontal rectangle 210A such that a dark (e.g., black) region is separated by a light (e.g., white) region just above the dark region. Moreover, the locations of the ROIs 220 may be predefined based on the size and position of the slant edges defined by the horizontal and vertical rectangles 210A, 210B on the target object 130. When an image of the target object 130 is captured by the image-capturing device 125, the centroids of each ROI 220 may be used to identify where the ROIs 220 are globally located. A local position of each ROI 220 may then be identified using the slanted edges defined by the horizontal and vertical rectangles 210A, 210B from where data may be sampled.

In other examples, the predefined locations of the ROIs 220 may be different than as shown in FIG. 2. In such examples, the relationship between the predefined locations and the respective horizontal and vertical rectangles 210A, 210B may still be similar in that each ROI 220 may intersect each horizontal and vertical rectangle 210A, 210B to provide black-to-white or white-to-black transitions between some black and white areas.

When the image-capturing device 125 captures an image of the target object 130, the locations of the ROIs 220 in the image may not necessarily correspond to their predefined locations due to various factors such as camera tilt, lens distortion, perspective distortion, etc. In some examples, such discrepancies between the predefined locations of the ROIs 220 and those in the image captured by the image-capturing device 125 may be resolved by identifying the central positions of the four circular fiducials 205 in the image. The positions of the four circular fiducials 205 may then be used to calculate and map the relative positions of the ROIs 220 in the image to the predetermined locations of the ROIs in the target object 130.

In some examples, the angles at which the horizontal and vertical rectangles 210A, 210B are rotated are the same. In other examples, the angles at which the horizontal and vertical rectangles 210A, 210B are rotated are different. Moreover, in other examples of the target object 130, the target object 130 may comprise more or fewer rectangles 210A, 210B and ROIs 220, each of which may comprise similar or different shapes. Similarly, the target object 130 may include different features and/or patterns than those shown in FIG. 2. For example, the target object 130 may comprise line pairs of different or similar densities, triangles, 1-dimensional (1D) and 2-dimensional (2D) barcodes, etc.

Each ROI 220 in FIG. 2 comprises a plurality of imaging sensing elements such as pixels. The number of pixels in each ROI 220 may depend upon a size of an image to be captured by the image-capturing device 125. In general, an ROI 220 may be as small as two pixels by one pixel or as large as necessary to cover most of an entire frame, depending on sensor characteristics and use cases. In some examples, each ROI 220 may define a relatively small sampling area such as a 75×75 or 100×100 pixel region. In other examples, each ROI 220 may define regions of other pixel sizes.

Further, the locations of each ROI 220 may be identified according to an x-axis and y-axis of a coordinate system. For example, each pixel within a particular ROI 220 may correspond to a particular point (e.g., x1, y1) of the coordinate system. The locations of each horizontal rectangle 210A, vertical rectangle 210B, and fiducial 205 may be identified in a similar manner.

The example test target 130 further includes a contrast chart 230 partially surrounding the horizontal and vertical rectangles 210A, 210B in the central location. The contrast chart 230 may comprise a greyscale chart having 12 patches (the upper patches are relatively light in color such that they may not appear visible in FIG. 2) of different densities to evaluate various optical characteristics. For example, the greyscale contrast chart 230 may be used to measure the tonal response, gamma, white balance, and noise characteristics of the image-capturing device 125. As another example, the greyscale contrast chart 230 may be used to measure an opto-electronic conversion function (OECF) and convert image data to an equivalent exposure space. In other examples, the contrast chart 230 may include more or fewer patches having similar or different patterns.

As discussed further below, the computing device 135 may utilize the known positions and orientations of the circular fiducials 205 and horizontal and vertical rectangles 210A, 210B to locate an ROI 220 associated with a particular horizontal rectangle 210A or vertical rectangle 210B. To this end, the computing device 135 may employ various computer vision techniques, including edge detection and thresholding schemes.

Figure 3:
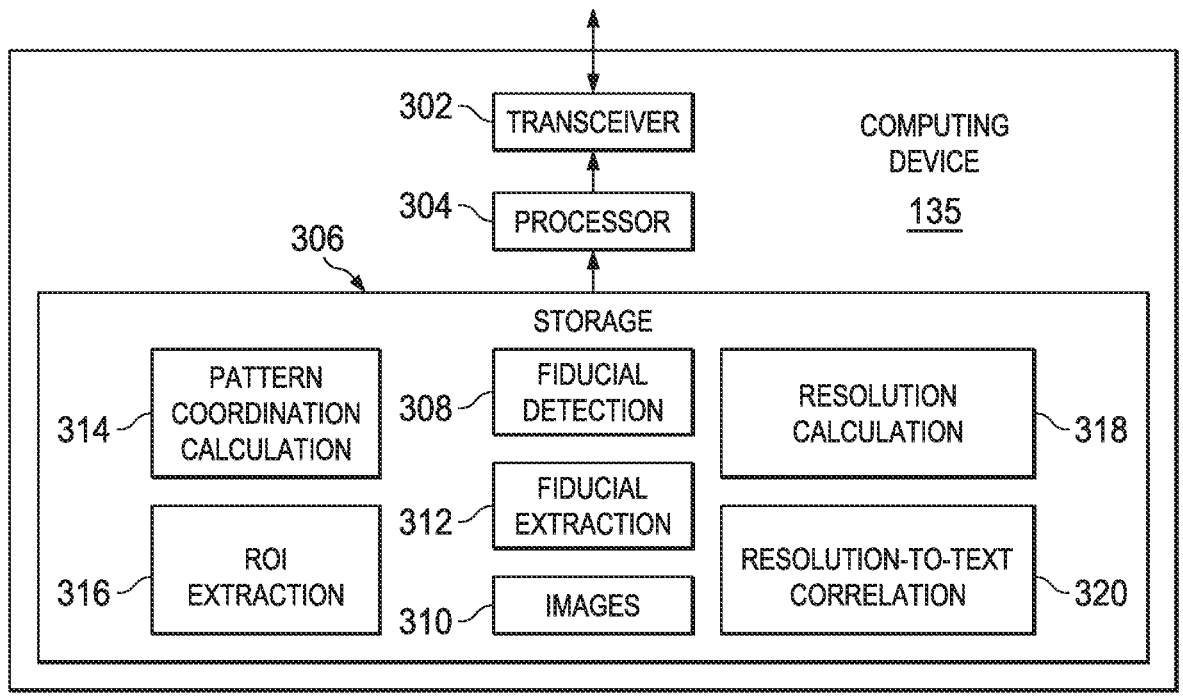
FIG. 3 shows a block diagram of a computing device shown in the test system of FIG. 1 in accordance with various examples.

FIG. 3 shows a block diagram of an example computing device 135 for evaluating optical performance in accordance with various examples. The computing device 135 includes a transceiver 302, a processor 304, and storage 306. The computing device 135 may also include various components and systems that have been omitted from FIG. 3 in the interest of clarity. For example, the computing device 135 may include display systems, user interfaces, etc. The computing device 135 may be implemented using a desktop computer, a notebook computer, a rack-mounted computer, a tablet computer or any other computing device suitable for performing the operations described herein.

In examples where the computing device 135 is separate from the image-capturing device 125, the transceiver 302 may communicatively couple the computing device 135 to the image-capturing device 125. For example, the transceiver 302 may include a network adapter that connects the computing device 135 to a wireless or wired network that provides communication between the image-capturing device 125 and the computing device 135. Such a network may be based on any of a variety of networking standards (e.g., IEEE 802) or be proprietary to communication between components of the test system 100.

The processor 304 is coupled to the transceiver 302. The processor 304 may include a general-purpose microprocessor, a digital signal processor, a microcontroller, a graphics processor, or other device capable of executing instructions retrieved from a non-transitory computer-readable storage medium. Processor architectures generally include execution units (e.g., fixed point, floating point, integer, etc.), storage (e.g., registers, memory, etc.), instruction decoding, instruction and data fetching logic, peripherals (e.g., interrupt controllers, timers, direct memory access controllers, etc.), input/output systems (e.g., serial ports, parallel ports, etc.) and various other components and sub-systems.

The storage 306 is a non-transitory computer-readable medium that stores instructions and data for access and use by the processor 304. The storage 306 may include any of volatile storage such as random access memory, non-volatile storage (e.g., a hard drive, an optical storage device (such as CD or DVD), FLASH storage, read-only-memory), or combinations thereof. The storage 306 includes fiducial detection 308, fiducial extraction 312, pattern coordinate calculation 314, ROI extraction 316, SFR calculation 318, SFR-to-text correlation 320, and images 310. The images 310 may include images captured by the image-capturing device 125 and transferred to the computing device 135 (e.g., directly or via transceiver 302). The fiducial detection 308, fiducial extraction 312, pattern coordinate calculation 314, ROI extraction 316, SFR calculation 318, and SFR-to-text correlation 320 include executable code or instructions that are executable by the processor 304 to process the images 310 and evaluate optical performance of the image-capturing device 125.

The fiducial detection 308 includes instructions that are executable by the processor 304 to detect the four fiducials 205 in an image of the target object 130. For example, fiducial detection 308 may employ various computer vision techniques such as edge detection and thresholding schemes to identify each fiducial 205 based on that fiducial's known position and orientation. As previously mentioned, the image-capturing device 125 may be disposed on an image plane, which may generally be parallel to an object plane on which the target object 130 is disposed when secured to the base portion 115.

In some examples, however, the image-capturing device 125 may be oriented at an angle with respect to the target object 130 such that the image plane is not parallel to the object plane. In such examples, an image captured by the image-capturing device 125 may be impacted by perspective distortion due to the non-parallel orientation of the imaging and object planes. For example, the impact may be such that a fiducial 205 appears as an elongated oval shape rather than circular.

The fiducial extraction 312 instructions are executable by the processor 304 to estimate the perspective transformation caused to the fiducial 205 using the known coordinates (e.g., x, y) of the fiducials 205 on the original target object 130 and coordinates of the fiducials 205 in the image captured by the image-capturing device 125. The latter coordinates may be obtained based upon the fiducials 205 identified by the fiducial detection 308. The fiducial extraction 312 may include instructions that are executable by the processor 304 to employ a keystone correction operation to compensate for the estimated perspective transformation based upon the known and obtained fiducial coordinates. The fiducial extraction 312 may then extract coordinate information associated with each fiducial 205 based upon the keystone correction operation.

The pattern coordinate calculation 314 includes instructions that are executable by the processor 304 to calculate the relative position of the slanted edges on the target object 130. For example, the extracted coordinate information may include absolute pixel locations corresponding to each fiducial 205. The pattern coordinate calculation 314 may include instructions that are executable by the processor 304 to generate a perspective transformation matrix using the absolute pixel locations of each fiducial 205. The processor 304 may then use the perspective transformation matrix to calculate the relative location of the slanted edges of the horizontal and vertical rectangles 210A, 210B on the target object 130.

The ROI extraction 316 includes instructions that are executable by the processor 304 to extract the ROIs 220 associated with the horizontal and vertical rectangles 210A, 210B based upon their relative locations, i.e., as calculated by the processor 304 through execution of the instructions included in the pattern coordinate calculation 314. For example, when calculating the positions of the ROIs 220, the processor 304 may crop each ROI 220 from the original image and convert them to a different color scale. In some implementations, the ROIs 220 may be extracted from either black to white, or white to black. For instance, a vertical slanted edge pattern defined by a vertical rectangle 210B at the top left corner of the target object 130 may be converted from black to white, while a vertical slanted edge defined by the right side of that vertical rectangle 210B may be converted from white to black. Thus, when extracting the coordinates of the ROI 220 located in the top left corner, the ROI 220 in the image of the target object 130 may be flipped such that the corresponding pixel values are all converted from black to white (or vice versa).

The resolution calculation 318 includes instructions that are executable by the processor 304 to calculate resolution metrics using the results obtained through instructions included in the fiducial detection 308, the fiducial extraction 312, the pattern coordinate calculation 314, and/or the ROI extraction 316. In some examples, the resolution metrics may include SFR, MTF, optical transfer function (OTF), contrast transfer function (CTF), or any combination(s) thereof. OTF generally refers to the Fourier transform of the point-spread function (i.e., the response of an imaging system to a point source or object), while CTF generally refers to the transfer function of a periodic line grating comprising alternating black and white lines of equal width. In some examples, CTF may be computed by measuring the contrast of a pattern (e.g., alternating black and white lines) of a known spatial frequency.

The resolution-to-text correlation 320 includes instructions that are executable by the processor 304 to correlate a resolution metric to text resolution. For example, the image-capturing device 125 may capture an image of multiple text targets that are substantially similar to the target object 130 except the text targets include text (e.g., a string of letters, numbers, symbols, and/or punctuation) at substantially similar locations as the horizontal and vertical rectangles 210A, 210B. In other words, the horizontal and vertical rectangles 210A, 210B in the target object 130 are replaced with different text in the text targets. For example, a text target may comprise text such as numbers (e.g., 0-9) and letters (e.g., A-Z) of a same font style, but of different font point sizes (e.g., 12 pt, 10 pt, 8 pt, etc.). An example of such a text target is discussed later with respect to FIGS. 6A and 6B.

The processor 304 may execute similar operations as described above to calculate resolution metrics based upon images of the different text target objects 130 captured by the image-capturing device 125. In turn, the resolution-to-text correlation 320 may cause the processor 304 to compare a resolution metric calculated based upon an image of the target object 130 with another resolution metric calculated based upon an image of one of the text targets so that a one-to-one correlation may be established between the resolution achieved at certain line pair spacing and the image-capturing device's 125 ability to resolve certain font sizes. For example, assuming that the resolution metric comprises MTF and that the processor 304 determines that the image-capturing device 125 achieves an MTF of 0.8 when resolving 3.2 line pairs per millimeter (mm), the processor 304 may then determine that this MTF correlates to the image-capturing device 125 being capable of resolving down to 4 pt font and higher.

The storage 306 may include additional logic that has been omitted from FIG. 3 in the interest of clarity. For example, the storage 306 may include communication instructions that are executable by the processor 304 to transfer information concerning a detected image between the processor 304 and another device. In some implementations, the computing device 135 may display image frames captured by the image-capturing device 125.

Figure 4:
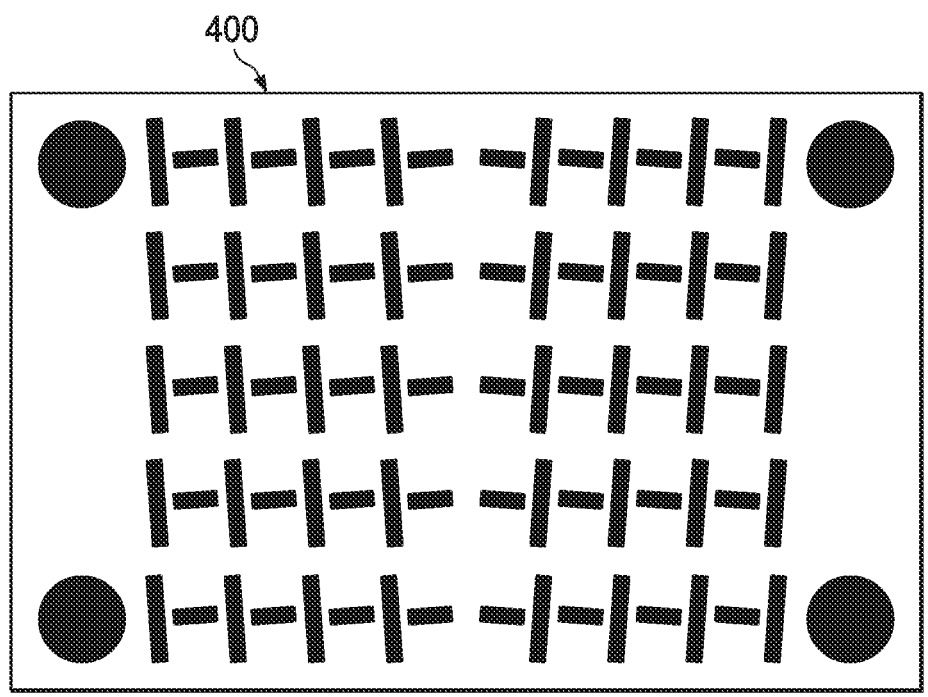
FIG. 4 shows a test pattern for evaluating depth of field in accordance with various examples.

FIG. 4 shows a test pattern 400 for evaluating depth of field (DOF) in accordance with various examples. DOF generally defines a range of distances at which a lens of the image-capturing device 125 remains in focus. In some examples, the computing device 135 may utilize the test pattern 400 to compute DOF across the entire FOV of the image-capturing device 125. Because the image-capturing device 125 may be mounted at an angle (e.g., using mount 120) with respect to a target object 130 placed on the based on the base portion 115, the test pattern 400 may be used to compute DOF over a range of distances using a single image captured by the image-capturing device 125. Accordingly, DOF may be computed in a relatively quick and efficient manner. In some examples, DOF may be computed based on a correlation between MTF and text resolution. For example, a range of MTF values computed for an image captured by the image-capturing device 125 may correspond to an ability of the image-capturing device 125 to resolve text of a certain size (e.g., 4 pt font) at a range of distances, e.g., from 55 cm to 62 cm.

Figure 5:
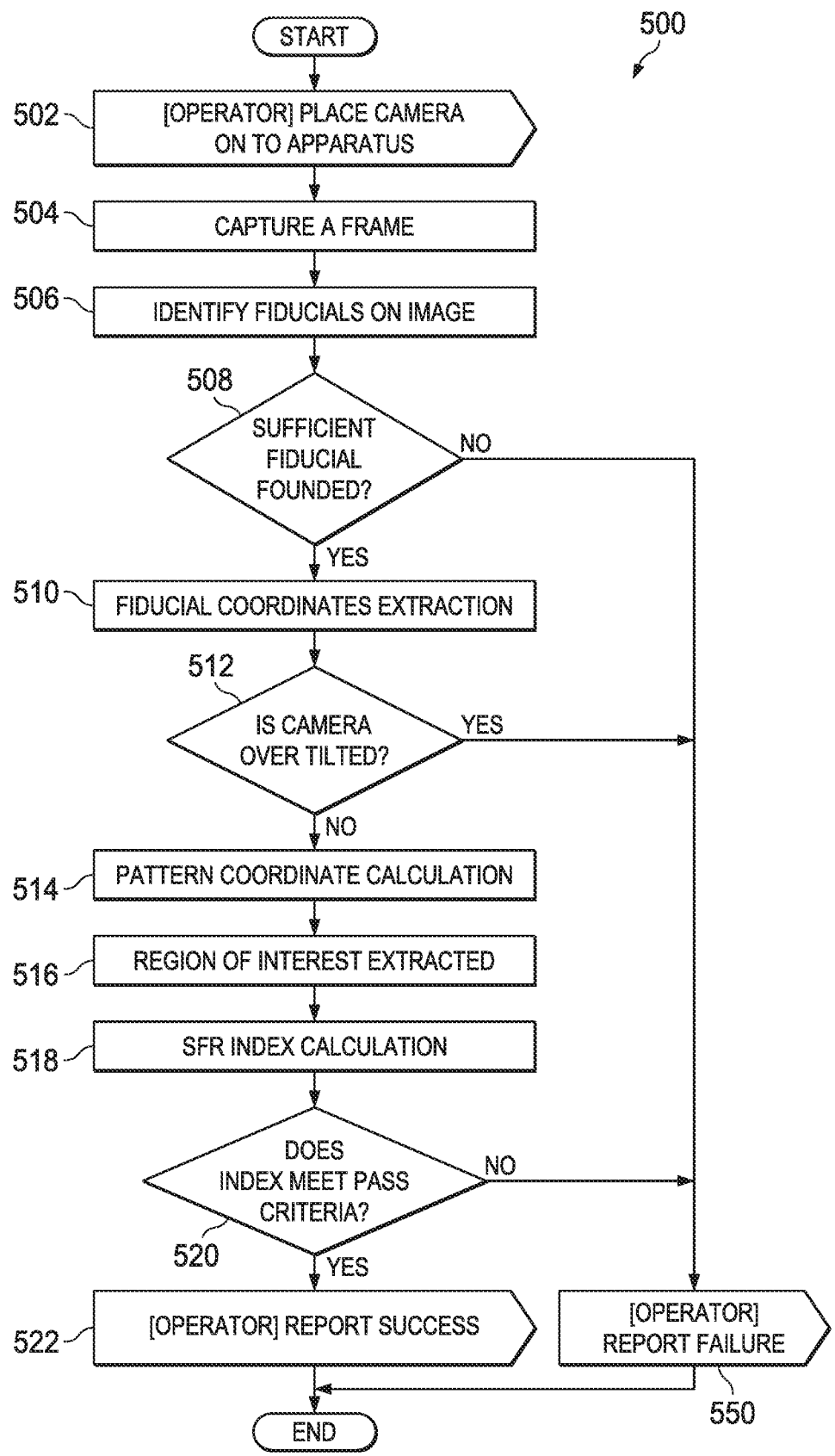
FIG. 5 shows a flow diagram for a method of evaluating optical performance in accordance with various examples.

FIG. 5 shows a flow diagram for a method 500 of evaluating optical performance in accordance with various examples of the disclosure. Though depicted sequentially as a matter of convenience, some of the actions shown can be performed in a different order and/or performed in parallel. Additionally, some implementations may perform only some of the actions shown. In some implementations, some of the operations of the method 500 can be implemented as instructions stored in a storage device and executed by a processor (e.g., 304).

In block 502, an operator places the image-capturing device 125 onto an apparatus (e.g., test fixture 105). In block 504, the image-capturing device 125 captures an image of the optical target 130. In block 506, fiducials 205 on the target object 130 are identified based upon the known relative positions between the fiducials 205 and ROIs. However, the positions of the fiducials 205 in the captured image may not necessarily correspond to their known positions, e.g., due to distortion, improper mounting of the image-capturing device 125, etc. As such, computer vision techniques may be employed to extract the absolute positions of the fiducials 205 in the captured image. Accordingly, the extracted absolute positions of the fiducials 205 may then be mapped to their known relative positions to identify the fiducials 205 in the captured image.

In block 508, the method 500 determines whether sufficient fiducials are identified. For example, the number of fiducials 205 on the target object 130 may be known in advance. As previously mentioned, while the example of the target object 130 in FIG. 2 includes four fiducials, a different number of fiducials may be included in other examples. For instance, the target object 130 may include more than four fiducials for more advanced optical evaluations.

For purposes of discussion, the method 500 assumes that the target object 130 includes four fiducials 205 as shown in FIG. 2. In block 508, therefore, the method 500 determines whether all four fiducials 205 have been identified. If not, the method 500 fails, in which case an error message may be generated at block 550 to notify the operator of the failure. Otherwise, the method proceeds to block 510, where the method 500 extracts the coordinates for each of the four fiducials 205 identified in block 506.

In block 512, the method 500 determines whether the image-capturing device 125 is tilted. For example, the coordinates extracted in block 506 may be evaluated to determine whether the fiducials 205 in the image captured in block 504 correspond with their known positions. If the extracted coordinates indicate that the locations of the fiducials in the captured image deviate from their known positions by a certain threshold, the method 500 may determine that the image-capturing device 125 or the target object 130 is possibly tilted or otherwise disoriented, in which case the method 500 fails and an error message may be generated at block 550.

Otherwise, the method 500 proceeds to block 514, where the method 500 calculates the relative locations of the slanted edges of the horizontal and vertical rectangles 210A, 210B on the target object 130, e.g., based on the fiducial coordinates extracted in block 510. In block 516, the method 500 may extract ROIs 220 associated with the horizontal and vertical rectangles 210A, 210B based upon the relative locations calculated in block 514. In block 518, the method calculates a resolution metric based on the ROIs 220 extracted in block 516. In block 520, the method 500 determines whether the resolution metric satisfies a predefined pass/fail threshold, as described below. If not, the method 500 fails and an error message may be generated at block 550. Otherwise, the method 500 succeeds, in which case a status message may be generated at block 522 to inform the operator that the method 500 was successful.

In some examples, the method 500 may be repeated multiple times such that a resolution metric may be calculated using multiple images of the same target object 130. For example, if the resolution metric calculated in block 318 is relatively consistent each time the method 500 is performed, the operator may determine that a confidence level of the method 500 is such that repeats are not warranted. As such, the method 500 may calculate resolution metrics using a single image captured by the image-capturing device 125.

However, the operator may determine to repeat the method 500, except using different text targets as discussed above. For each text target, the resolution metric calculated in block 518 may be recorded and later consulted to determine an appropriate pass/fail threshold to be used in block 520. For example, an operator may determine whether the resolving ability of the image-capturing device 125 is sufficient based on the resolution metric calculated for a text target having a particular font size. More specifically, if a resolution metric calculated for a text target indicates that the image-capturing device 125 is capable of resolving down to the particular font size desired (e.g., 4 pt font), this resolution metric may be used to set the pass/fail threshold.

Figure 6A:
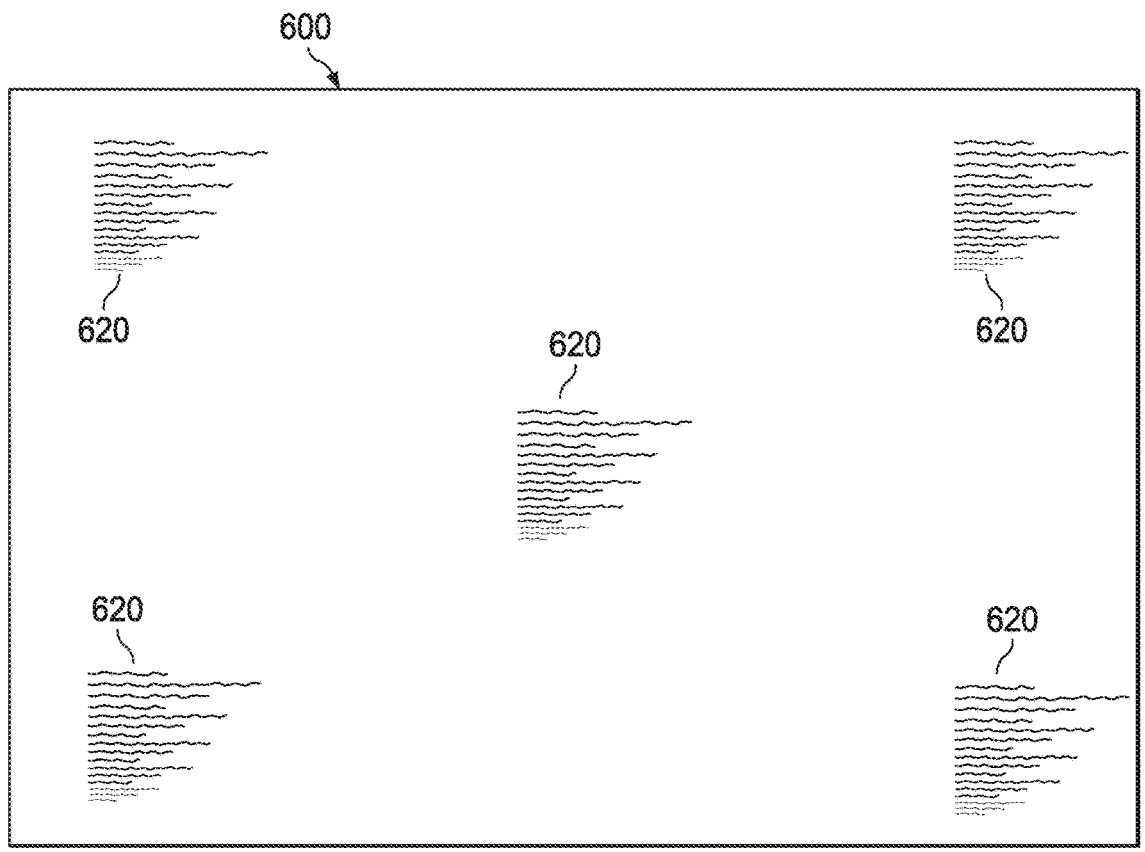
FIG. 6A shows a text target overlaying a target object in accordance with various examples.
Figure 6A:
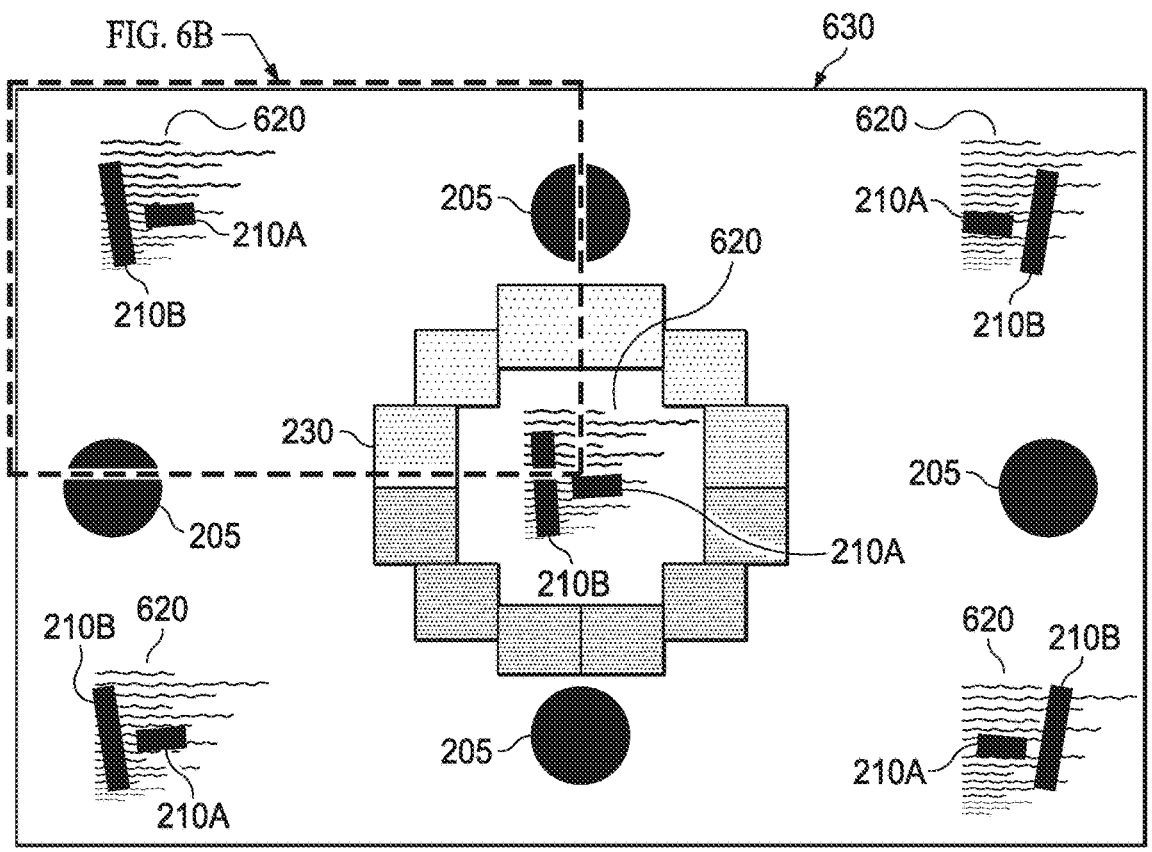
Figure 6B:
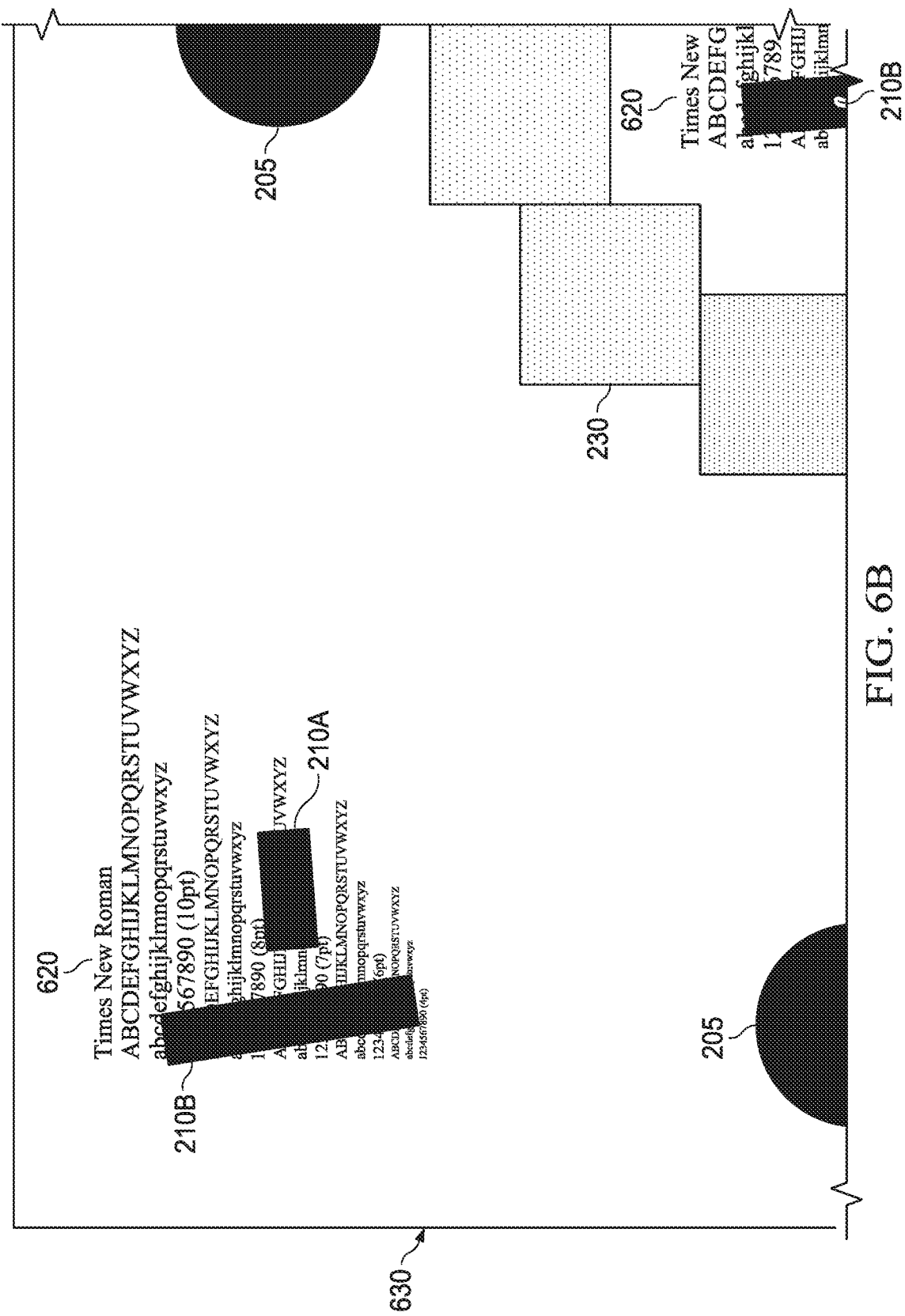
FIG. 6B shows an exploded view of text shown in the text target in accordance with various examples.

FIG. 6A shows an example of a text target 600 overlaying a target object 630. The text target 600 includes text 620 located in substantially the same areas as the ROIs 220 in FIG. 2. FIG. 6A shows a conceptual depiction of the text 620. FIG. 6B shows an exploded view of the upper left-hand portion of the target object 630 surrounded by dashed lines in FIG. 6A, where actual text 620 is shown in accordance with various examples. The target object 630 is substantially similar to the target object 130, except the ROIs 220 in FIG. 2 are replaced by the text 620. In other examples, the target object 630 may be different than the target object 130. Similarly, the text 620 in FIG. 6A may be located at different areas in other examples. As shown in FIG. 6B, the text 620 may include an alternating series of alphabets and letters of a particular font style, but of different font sizes. As such, an operator may determine whether the image-capturing device 125 is capable of resolving down to a particular font size using a single target, i.e., rather than using multiple text targets that each have text of a distinct font size. For example, by using the target object 630 shown in FIGS. 6A and 6B, an operator may determine that the image-capturing device 125 is capable of resolving Time New Roman font down to a 7 pt size, but not 6 pt size or lower. In some examples, the text 620 in FIG. 6B may be replaced with text of different styles and/or font sizes. Further, in some examples the text 620 may be replaced with different text, characters, symbols, or the like. In other examples, the text target 600 may include substantially similar text 620, except the size and/or style of the text 620 may vary.

Figure 7:
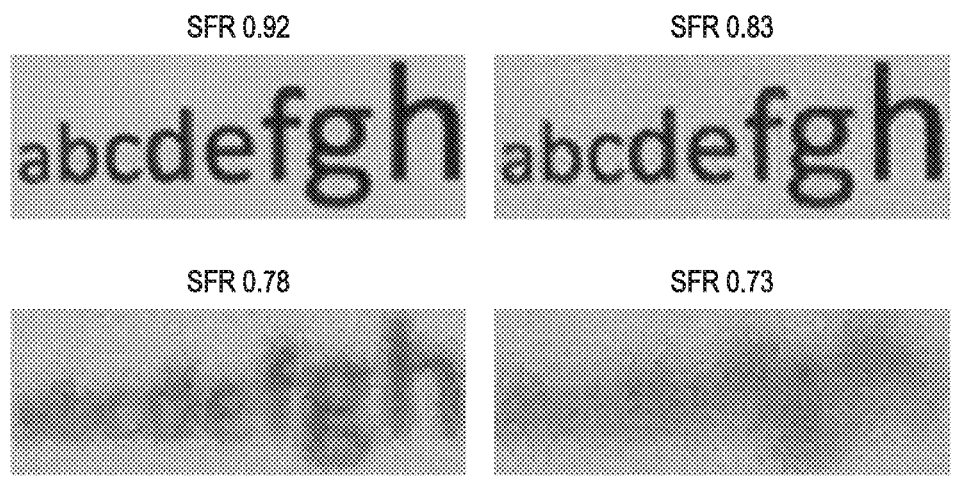
FIG. 7 shows a comparison of images of different resolutions in accordance with examples of the present disclosure.

FIG. 7 shows a comparison of images of different resolutions in accordance with examples of the present disclosure. Each image shown was captured under substantially similar conditions (e.g., similar lighting and setup), except four different image-capturing devices having different resolving abilities were used. It is apparent from the example in FIG. 7 that the image becomes more blurry as SFR (or MTF) decreases, meaning more noise may be present as the sharpness of edges are reduced in the blurrier images. It is also apparent from this example that a correlation exists between SFR and text legibility. For example, as shown in the lower left-hand corner, once SFR reaches 0.78, the text becomes difficult to read. Therefore, an operator may conclude that the optical performance of the image-capturing device that captured the image in the lower left-hand corner is inadequate.

In contrast, the images in the upper row of FIG. 7 show that the text remains readable when SFR reaches 0.83 or higher. Accordingly, the operator may use these SFR values as benchmarks when setting the pass/fail threshold to be used in block 520 of FIG. 5. For example, if a resolution metric calculated in block 518 for the optical target 130 corresponds to an SFR of 0.83 or higher, the method 500 may be determined to be successful, in which case a success message may be generated at block 522.

In other examples, the techniques disclosed herein may be used to evaluate the optical performance of any suitable imaging system or device. For instance, in imaging systems used for applications such as scanning and optical character recognition (OCR), the disclosed techniques may be used to decipher between acceptable and unacceptable image quality by setting a pass/fail threshold as described with respect to FIG. 5. In other examples, the techniques disclosed herein may be used to test the raw optical quality of an imaging device. In other examples, the techniques disclosed herein may be used to test and/or further refine the tuning of a sharpness technique, which may comprise machine-readable instructions stored on the storage 306 and executable by the processor 304.

In some examples, the sharpness technique may comprise machine-readable instructions encoded in the storage 306. In such examples, the processor 304—or some other suitable component on the computing device 135—may comprise an image signal processor (ISP) used to enable the sharpness technique, which may then be tested and refined when the image-capturing device 125 captures an image of a slanted edged (e.g., the sides of the horizontal and vertical rectangles 210A, 210B) in a target object (e.g., target object 130 or 630). The processor 304 may then compute MTF values and correlate those values to text as previously discussed. If the correlation satisfies predefined requirements (e.g., exceeds a text resolution threshold), the sharpness technique may be deemed acceptable, in which case tuning and refinements are not necessary. If not, the processor 304 may execute instructions stored in storage 306 to tune the sharpness technique to satisfy the predefined requirements.

In some examples, machine-readable instructions stored on the storage 306 may comprise the sharpness technique, in which case the machine-readable instructions may be executed by the processor 304 after an image of a target object (e.g., target object 130 or 630) is captured such that sharpness may be enhanced immediately (e.g., prior to the image being viewed by a user of the image-capturing device 125). For instance, the machine-readable instructions may be executed to perform enhancements to features in the image (e.g., text, edge boundaries, or the like) of the target object.

The above discussion is meant to be illustrative of the principles and various examples of the present disclosure. Numerous variations and modifications to the above disclosure are possible. It is intended that the following claims be interpreted to embrace all such variations and modifications.

What is claimed is:

1. A non-transitory machine-readable storage medium encoded with instructions executable by a processor, the machine-readable storage medium comprising:
   instructions to identify fiducials on a target comprising multiple sample areas;
   instructions to determine positions of the fiducials in relation to the multiple sample areas;
   instructions to detect a different region of interest (ROI) associated with each of the multiple sample areas based upon the positions;
   instructions to calculate an optical performance metric based upon the ROI associated with each sample area; and
   instructions to determine a text resolution based upon the optical performance metric.

2. A non-transitory machine-readable storage medium in accordance with claim 1 wherein each of the multiple sample areas comprises a distinct pair of alternating black and white lines having equal densities as one another, a slanted edge target, or both.

3. A non-transitory machine-readable storage medium in accordance with claim 1 comprising:
   instructions to receive a single image of the target; and
   instructions to compute a depth of field (DOF) across an entire field of view (FOV) of an image-capturing device using the single image.

4. A non-transitory machine-readable storage medium in accordance with claim 1 wherein the multiple sample areas comprise one sample area disposed at a center of the target and other sample areas disposed within a predetermined distance of corners of the target.

5. A non-transitory machine-readable storage medium in accordance with claim 4 wherein each of the multiple sample areas comprises a horizontal rectangle and a vertical rectangle, the horizontal and vertical rectangles displaced from one another, and wherein each ROI partially overlaps a different one of the horizontal and vertical rectangles.

6. A testing system comprising:
   a processor; and
   a storage encoded with instructions executable by the processor to:
      identify fiducials on a target comprising multiple sample areas, the multiple sample areas including a first sample area and a second sample area;
      employ a computer vision technique to determine positions of the fiducials in relation to the first and second sample areas;
      detect, based upon the positions of the fiducials, a first region of interest (ROI) and a second ROI associated with the first sample area and the second sample area, respectively;
      calculate an optical performance metric based upon the first and second ROIs associated with the first and second sample areas, wherein the optical performance metric is calculated using a single image of the target; and
      determine a text resolution based upon the optical performance metric.

7. A testing system in accordance with claim 6 comprising an image-capturing device, coupled to the processor, to capture the single image, wherein the instructions are executable by the processor to compute a depth of field (DOF) using the single image.

8. A testing system in accordance with claim 7 wherein the instructions are executable by the processor to:
   compute the DOF across an entire field of view (FOV) of the image-capturing device; and
   evaluate an ability of the image-capturing device to resolve text based on a correlation between the text resolution and the DOF across the entire FOV.

9. A testing system in accordance with claim 6 wherein the instructions are executable by the processor to evaluate a raw optical quality of an image-capturing device based upon the optical performance metric, wherein the optical performance metric is a modulation transfer function (MTF), a contrast transfer function (CTF), or a spatial frequency response (SFR).

10. A testing system in accordance with claim 6 wherein the target comprises a transmissive test chart disposed atop a light panel to provide uniform lighting through the transmissive test chart.

11. A test system comprising:
    a test fixture to secure a target; and
    a storage encoded with instructions executable by a processor to:
       identify a first marker and a second marker on the target, the target comprising a first slanted edge target and a second slanted edge target;
       determine positions of the first and second markers in relation to the first and second slanted edge targets;
       detect, based upon the positions of the first and second markers, a first region of interest (ROI) and a second ROI associated with the first and second slanted edge targets, respectively;
       calculate an optical performance metric based upon the first and second ROIs associated with the first and second slanted edge targets; and
       determine a text resolution based upon the optical performance metric.

12. A test system in accordance with claim 11 wherein the instructions are executable by the processor to employ a computer vision technique to determine the positions of the first and second markers, the first and second markers comprising a first registration mark and a second registration mark, respectively.

13. A test system in accordance with claim 11 wherein the instructions are executable by the processor to refine a sharpness technique based upon the optical performance metric, wherein the optical performance metric is a modulation transfer function (MTF), a contrast transfer function (CTF), or a spatial frequency response (SFR).

14. A test system in accordance with claim 11 wherein the test fixture includes a rotatable mounting portion to secure an image-capturing device at a desired angle with respect to the target such that the first and second slanted edge targets are captured at different depths when the image-capturing device captures a single image of the target.

15. A test system in accordance with claim 14 comprising instructions to compute a depth of field (DOF) across an entire field of view (FOV) of the image-capturing device using the single image.

\* \* \* \* \*